United States Patent [19]

Zander et al.

[11] Patent Number: 5,262,811
[45] Date of Patent: Nov. 16, 1993

[54] FILM EJECTING CASSETTE

[75] Inventors: Dennis R. Zander, Penfield; David C. Smart, Rochester; Joel S. Lawther, Rochester; Eugene Sisto, Rochester, all of N.Y.

[73] Assignee: Eastman Kodak Company, Rochester, N.Y.

[21] Appl. No.: 892,881

[22] Filed: Jun. 3, 1992

[51] Int. Cl.⁵ .............................................. G03B 17/26
[52] U.S. Cl. .................................... 354/275; 242/71.1
[58] Field of Search ............... 354/275; 242/197, 198, 242/71.1

[56] References Cited

U.S. PATENT DOCUMENTS

| | | | |
|---|---|---|---|
| 1,469,485 | 10/1923 | Rivetta . | |
| 1,921,560 | 8/1933 | Case . | |
| 2,552,200 | 5/1951 | Mihalyi | 242/71 |
| 2,575,024 | 11/1951 | Mihalyi . | |
| 2,731,894 | 1/1956 | Leitz et al. . | |
| 3,323,744 | 6/1967 | Chesley et al. | 242/71.1 |
| 3,631,971 | 1/1972 | Rinkleib | 206/52 R |
| 4,938,429 | 7/1990 | Robertson et al. | 242/71.1 |
| 4,962,401 | 10/1990 | Takahashi | 354/275 |

FOREIGN PATENT DOCUMENTS

| | | |
|---|---|---|
| 0428072A2 | 11/1990 | European Pat. Off. . |
| 619325 | 9/1935 | Fed. Rep. of Germany . |
| 820370 | 8/1950 | Fed. Rep. of Germany . |
| 2651407B2 | 11/1976 | Fed. Rep. of Germany . |
| 3907539A1 | 3/1989 | Fed. Rep. of Germany . |
| 4002788A1 | 1/1990 | Fed. Rep. of Germany . |
| 1-231045 | 9/1989 | Japan . |
| 2-18544 | 1/1990 | Japan . |
| 2-64533 | 3/1990 | Japan . |
| 2-71258 | 3/1990 | Japan . |
| 2-115836 | 4/1990 | Japan . |
| 2-124564 | 5/1990 | Japan . |
| 2-170156 | 6/1990 | Japan . |
| 2-201441 | 8/1990 | Japan . |
| 2-214853 | 8/1990 | Japan . |
| 2-293742 | 12/1990 | Japan . |
| 2-301735 | 12/1990 | Japan . |
| 3-75637 | 3/1991 | Japan . |
| 3-80243 | 4/1991 | Japan . |

*Primary Examiner*—Monroe H. Hayes
*Attorney, Agent, or Firm*—D. Peter Hochberg; Mark Kusner

[57] ABSTRACT

A photographic film cassette comprising a housing with a hinged lid thrusts film therefrom during the film threading process. The cassette comprises a rotatable film spool concentrically positioned in a housing, within and adjacent to a rotatable, outwardly convex panel member having end plates with camming structure thereon. Corresponding cam followers are located on the interior of the lid, and when the panel member is rotated by a drive spindle accessible to the member through an opening in an end of the housing, the member rotates, camming the lid onto an open position. Film engaged to the member's outer surface by a detent projecting from the surface through a perforation in the film is thrust out of the cassette into engagement with the camera's film transport mechanism. During rewinding, a drive spindle accessible to the spool through the housing's end opening rewinds the film until the perforation is sensed by camera sensing means. The housing lid is then partially closed, bringing shoulders on the lid's interior into contact with the film and forcing the perforation back onto the detent. Continued rewinding of the last of the film results in further camming of the followers caused by movement of the film, closing the lid.

14 Claims, 5 Drawing Sheets

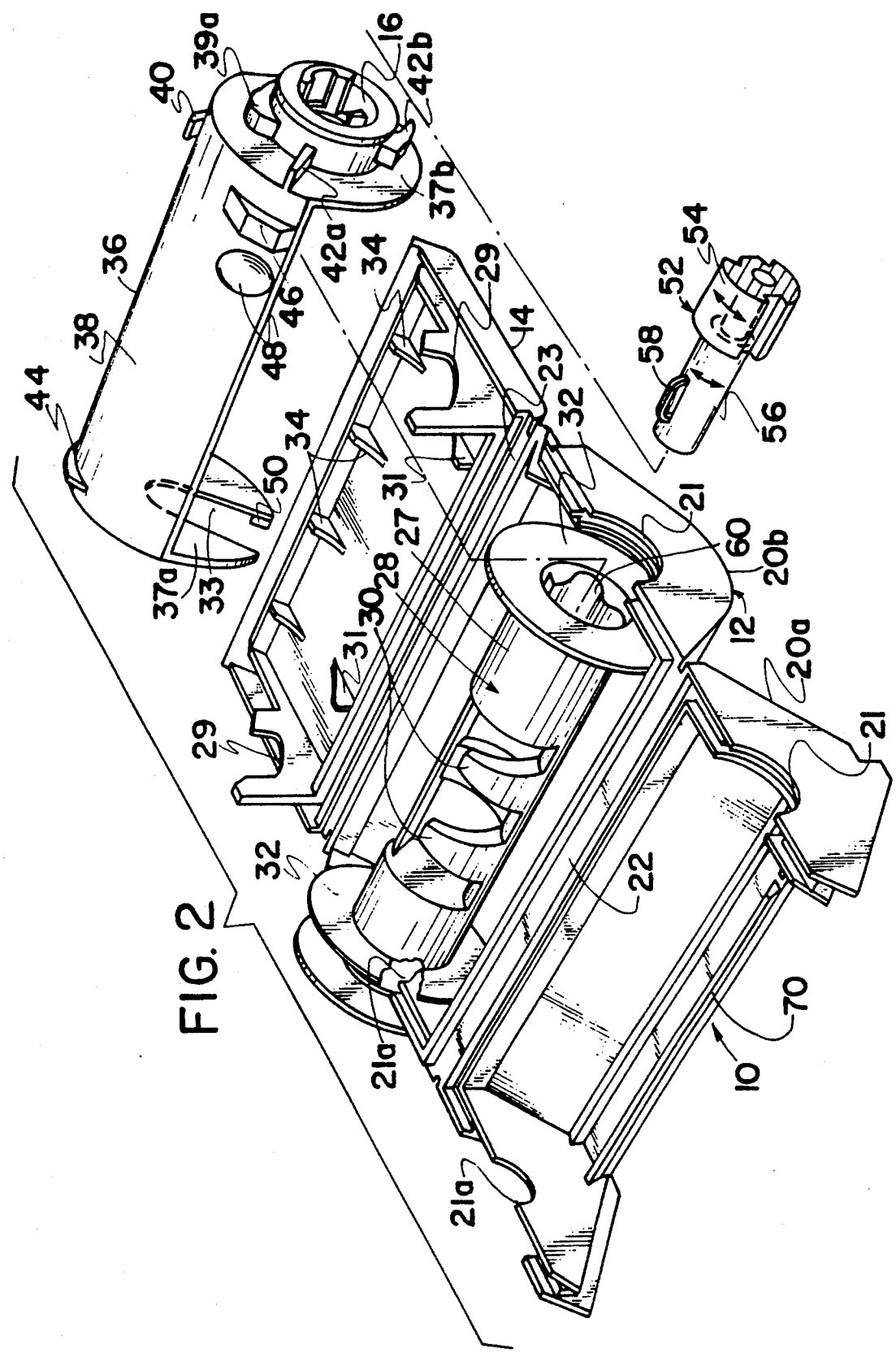

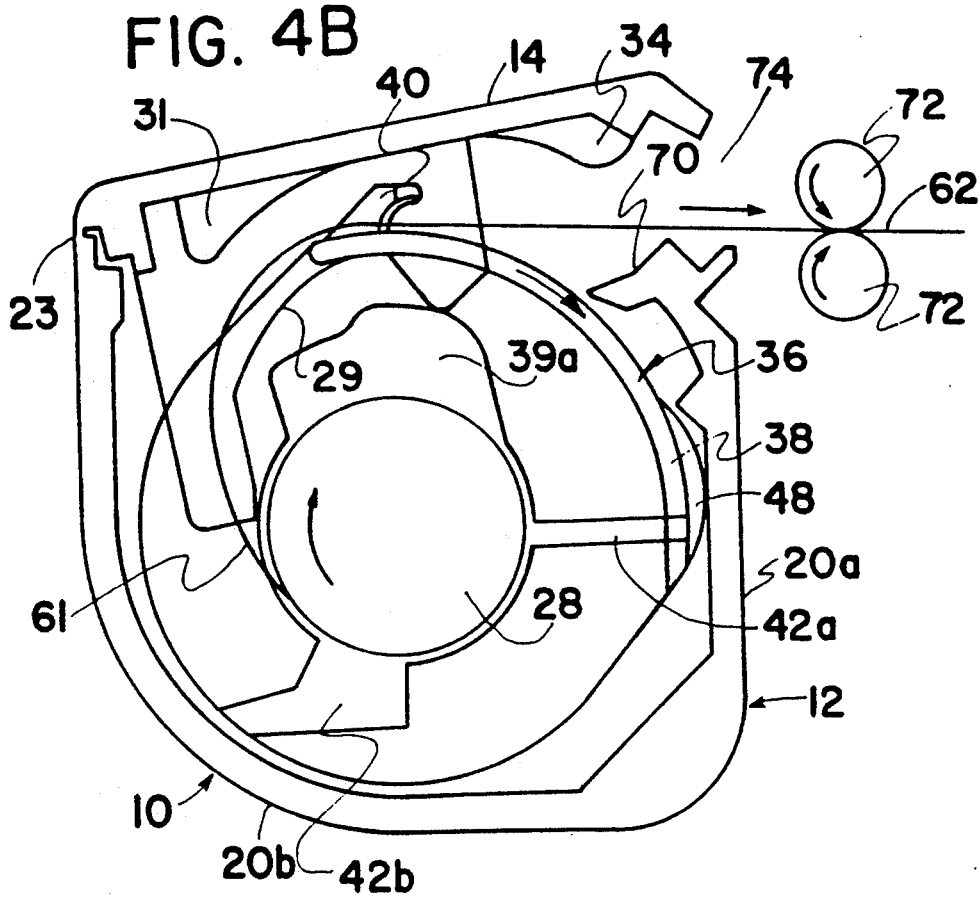
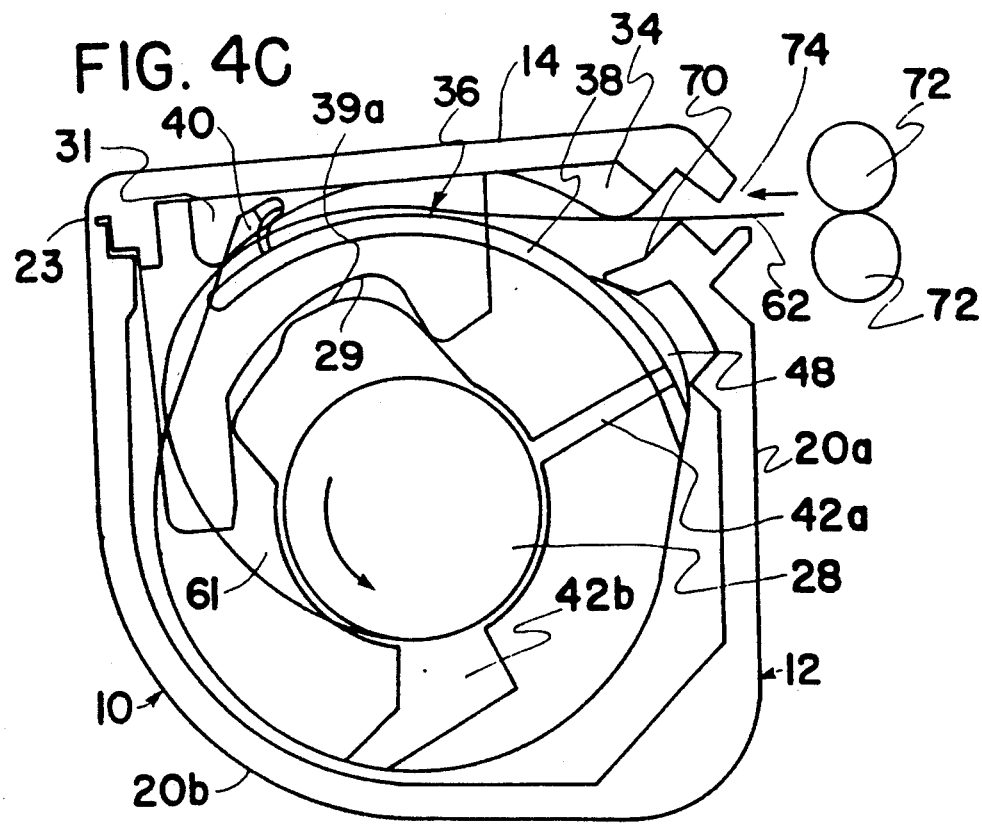

FILM EJECTING CASSETTE

TECHNICAL FIELD

This invention relates to film cassettes for holding photographic film that can partially eject the film therefrom at the beginning of the film threading process. Specifically, this invention relates to cassettes for photographic film which during the film threading process are designed to eject sufficient film therefrom to engage film transport means that moves the film across the camera's film gate into its winding mechanism.

BACKGROUND ART

In many cameras of the type in which the film is stored in cassette containers, typically in 35 mm cameras, the filmstrip is wound onto a flanged spool that is rotatably supported within a hollow cylindrical shell or housing. A free end portion of the filmstrip, several inches long, which is commonly referred to as the "film leader", protrudes from a light-trapped, plush-lined slit or "mouth" formed between a pair of throat portions of the cassette shell. Commonly, in the process of loading the camera, the back is removed therefrom and the film cassette is inserted into a recess designed to receive it located on one side of the camera. The leader is then manually grasped and pulled from the cassette for a sufficient distance to allow it to be engaged by the camera's film transport mechanism.

While the system described is capable of functioning satisfactorily, it causes considerable mental stress for many individuals, particularly novice photographers, and in fact surveys have shown that the process of loading film cassettes into cameras is regarded by many photographers with considerable trepidation. Some individuals, for example, are concerned about pulling the film leader so far from the mouth of the cassette that the first film frame of the roll will be inadvertently exposed to light during the loading process. Still others worry that the leader will not be properly connected to the transport mechanism, and thus will fail to advance properly within the camera after the latter's closure. In any event, apprehension of the type described tends to discourage individuals from becoming involved in photography, and is therefore, undesirable from a number of standpoints.

The concerns described in the preceding have long been recognized, and a number of approaches have been suggested in efforts to overcome them. In this regard, systems involving special means associated with the film strip to pull it across the film gate of the camera to the winding mechanism have been examined. However, such system often involve special complexities in the film gate, as well as in the windup mechanism, and to that extent, therefore, they are objectionable.

Other methods have been considered which thrust the film out of the cassette and push it through the film gate into the camera's windup device. Notwithstanding resort to such methods, to varying degrees they typically suffer from the fact that the procedures result in damage to the edges of the film and/or cause pressure marks within the film's image area.

Still other processes depend upon inclusion of a stressable member within the cassette, for example a spring, capable of storing energy and releasing it upon the opening of the cassette. The spring causes the film to be extended from its initial position within the cassette to a point at which it is accessible, for example, to a roller drive or sprocket transport system that causes the film to be pulled across the film gate into the camera windup mechanism. Unfortunately, such systems cause the spring to "work" against the plastic film and stress it as a consequence. In addition, these systems require metal springs; consequently, the fabrication of the cassette entirely from plastic is not possible in such instances.

SUMMARY OF THE INVENTION

In view of the preceding, therefore, it is a first objective of this invention to provide cassettes that facilitate the loading of film into cameras.

A second objective of this invention is to provide a film cassette for a camera in which it is unnecessary to pull a film leader manually from the cassette in order to interconnect it with the camera's transport mechanism.

An additional aspect of this invention is to provide a film cassette for a camera in which the film is thrust therefrom as a consequence of the operation of the camera's drive mechanism.

A further objective of this invention is to provide a film-ejecting cassette that requires no springs for its proper functioning.

Another objective of this invention is to provide a film-ejecting cassette whose functioning does not produce either film edge damage, or result in marks on the film surface.

Another aspect of this invention is to provide a film cassette for a camera having a light-lock of a type which involves no plush, and which requires no film leader protruding from the cassette.

Yet a further object of this invention is to provide a film cassette for a camera having an openable light-lock that is positively held in its closed position except when film is being withdrawn therefrom or returned thereinto.

The preceding and additional objects are achieved according to a preferred embodiment of the invention are provided by a cassette for photographing film comprising a cylindrical film spool, flanged at each of its two ends, for holding the film, which spool is provided with means for engaging a spool drive. The cassette also contains a rotatable panel having a transversely convex outer surface with plates connected to each of its ends. The panel includes means for engaging a panel rotation drive, and each of the plates has camming means located on its outer face, while the convex outer surface of the panel is provided with film engaging means. The spool and panel are positioned concentrically adjacent each other in a housing which has a hinged lid with cam following structure located thereon. The housing is furnished with drive access means, and the panel and spool are both rotatably positioned within the housing.

A further preferred embodiment of this invention is provided by a cassette for photographic film comprising a cylindrical film spool, flanged at each of its two ends for holding the film. One end of the spool is provided with means for engaging a spool drive. The cassette also includes a rotatable panel member having a transversely convex outer surface with a plate connected to each of its two ends, one of the plates having means for engaging a panel rotation drive. The cassette also includes a rotatable panel having a transversely convex outer surface with a plate connected to each of its ends, one of the plates having means for engaging a panel rotation drive. Each of the outer faces of the plates has camming means and panel rotation limiting means located thereon, the outer surface of the panel also being provided with a detent adapted to engage a perforation in the film. Both the spool and panel are concentrically positioned adjacent each other within the housing, and the housing has a drive access opening on one of its two ends, as well as a hinged lid with cam following structure located on the interior thereof. The spool and panel are arranged so that their drive engagement means are located adjacent the drive access opening.

BRIEF DESCRIPTION OF THE DRAWINGS

The invention will be better understood when reference is had to the following figures, in which like-numbers refer to like-parts, and in which

FIG. 2 is an isometric, exploded view of a film cassette of the invention;

FIG. 4B is a semi-schematic, cross-sectional end view of a film cassette of the invention in its film dispensing configuration;

FIG. 4C is a semi-schematic, cross-sectional end view of a film cassette of the invention in its film rewinding configuration;

DESCRIPTION OF THE PREFERRED EMBODIMENTS

Figure 1:
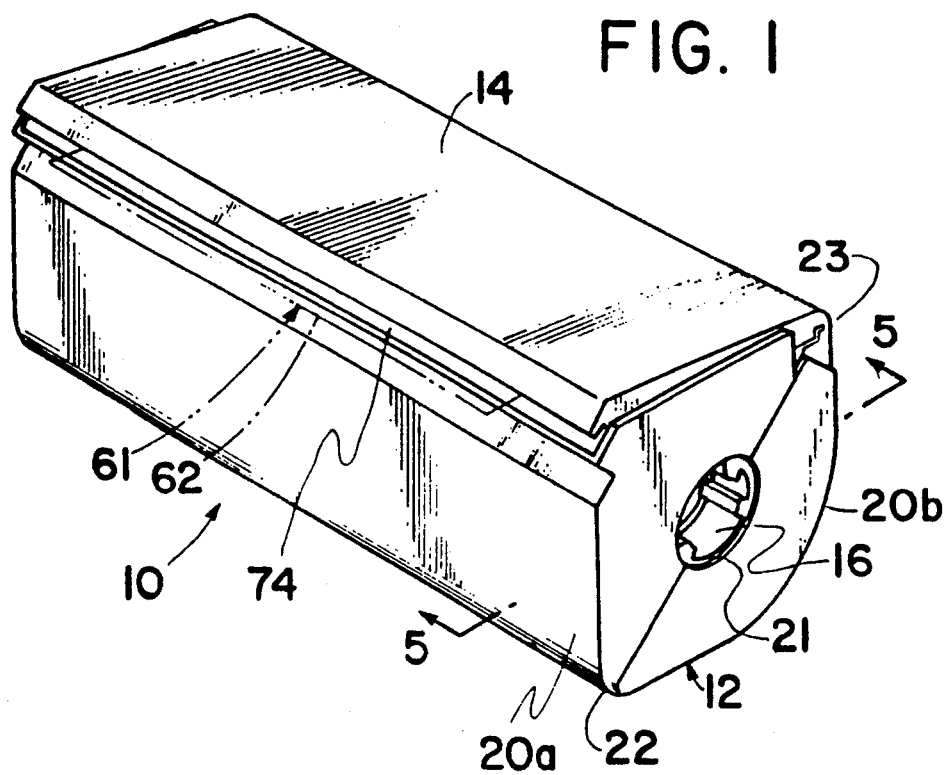
FIG. 1 is an isometric view of a film cassette of the invention in its opened configuration.

FIG. 1 shows an isometric view of a film cassette of the invention, generally 10, in its open position in which the hinged lid 14 has been pivoted in a clockwise direction about lid hinge 23. The housing body of the cassette, generally 12, is provided with an access opening 16 for a drive spindle which permits the film spool and thrust wing, better seen in FIG. 2, to be appropriately rotated.

FIG. 2 is an isometric exploded view of a film cassette of the invention primarily comprising three main parts, i.e., a housing, generally 12 a spool, generally 28, and a thrust wing, generally 36.

The spool 28 includes a generally cylindrical shaft 27 with spool film flanges 32 located on either end thereof. The shaft is provided with suitable means, for example, spoof film anchors 30 for attaching the end of a film strip thereto by means of perforations in the film, better seen in FIG. 3.

Concentrically positionable in a co-axial relationship adjacent thereto, is thrust wing 36 which comprises a wing panel 38, at the ends of which are fastened end plates 37a and 37b, respectively.

The wing panel 38 is provided with a film thrust detent hook 40, which serves the purpose of engaging film passing thereover by means of a perforation in the film, as will be hereinafter described. Also located on the exterior surface of the thrust wing 36, which has a transversely convex shape, is a film guide 46 which serves to lift the film from the surface of the wing in the process of guiding it out of the mouth of the open cassette during the thrusting process, as will also be described in further detail. A friction detent 48 desirably extends from the exterior surface of the thrust wing 36, which frictionally engages the interior of housing 12 for the purpose of allowing the thrust wing to maintain a given orientation relative to the rest of the cassette until purposely moved therefrom. A film edge guide 44 also forms part of the exterior surface of the trust wing 36 to guide the film edge during the process of its being moved into or out of the cassette.

End plate 37b is seen to be provided with a camming surface 39a thereon, which with the assistance of one of the cam followers 29 functions to open, close, and lock lid 14, as is detailed more fully in the description below.

End plate 37b is also provided with rotation stops 42a and 42b which serve to limit the rotation of thrust wing 36, thereby maintaining it within designated rotational operating parameters. End plate 37b is further provided with a drive spindle access port 16 in which drive engaging means are located adapted to be engaged and driven by a drive spindle, 54. The access port 16 also provides ingress for a drive spindle to access spool port 60 in which means are located that allow engagement of drive spindle 56 to drive spool 28.

A somewhat similar end plate 37a is located on the other end of thrust wing 36, which is better seen and described in connection with FIG. 2A.

The spool 28 is assembled adjacent to, and concentric with thrust wing 36, and the resulting assembly is enclosed within housing 12. Housing 12 comprises a body segment 20a, hingeably connected by body hinge 22 to body segment 20b. In turn, the latter is hinged by lid hinge 23 to cassette lid 14. The interior of the cassette lid is provided with cam followers 29, which cooperatively engage the cams located on the end plates associated with thrust wing 36. Also provided on the interior surface of lid 14 are ribs 31 which force film passing in contact therewith against film thrust detent hook 40, facilitating the engagement of film perforation 64 therewith during the process of rewinding the film back in the cassette, as will be set forth in more detail hereinafter. Drive spindle access ports 21 are provided in body segments 20a and 20b for the purpose of allowing drive spindle assembly, generally 52, to engage the drive spindle engaging structure in access ports 16 and 60. While other forms of drive spindle may be employed, a drive assembly such as 52 may comprise a wing drive spindle 54, concentrically positioned adjacent spool drive spindle 56. A depressible engaging spring 58 may also be provided to mate with the engaging structure in spool port 60 after having passed through access port 16. If desired, ports 21a may be provided to allow insertion of a film-type identification plug, not shown, in the far end of spool 28.

Figure 2A:
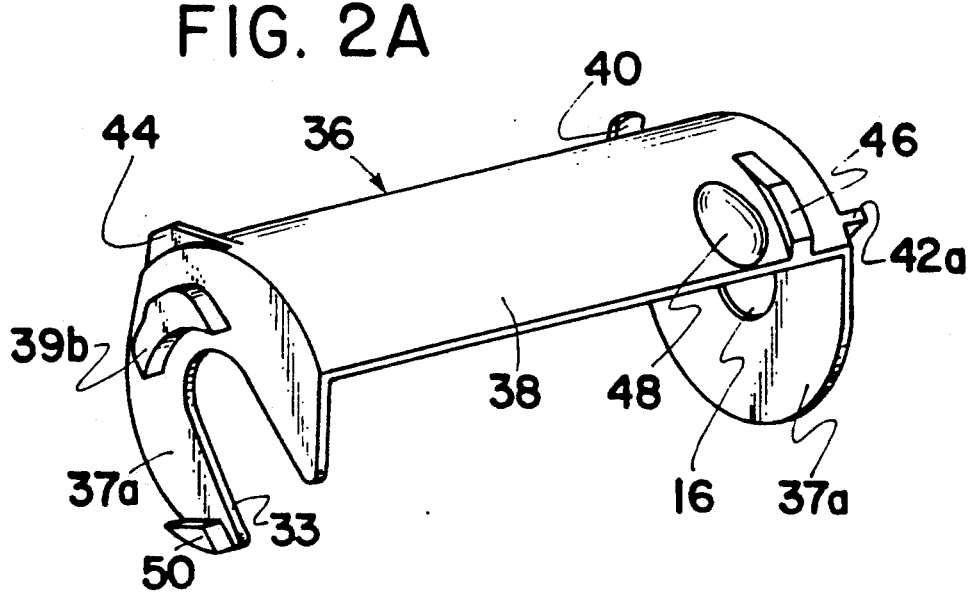
FIG. 2A is an isometric view of a rotatable panel which forms a part of the film cassette of the invention.

FIG. 2A is another isometric view of thrust wing 36, viewed from an end opposite to that shown in FIG. 2. Again, it will be seen that thrust wing 36 comprises a wing panel 38 the ends of which are connected to end plates 37a and 37b, respectively. The friction detent 48 and film guide shoulder 46 serve the purposes previously described, as do film thrust detent hook 40, rotation stop 42a, and the drive spindle port 16.

At the other end of the thrust wing 36 will be found an assembly slot 33 which facilitates the concentric positioning of the thrust wing 36 over the end of spool 28. On the same end are to be seen film edge guide 44 and camming structure 39b, the latter being similar to camming structure 39a on the opposite end of thrust wing 36. A projecting tab 50 engages one of the lid cam followers 29 and acts to support the cassette lid 14 in an open position when film is being dispensed from, or rewound into the cassette 10. Film edge guide 44 serves as a guide for the film during its movement into and out of the cassette, as previously indicated.

Figure 3:
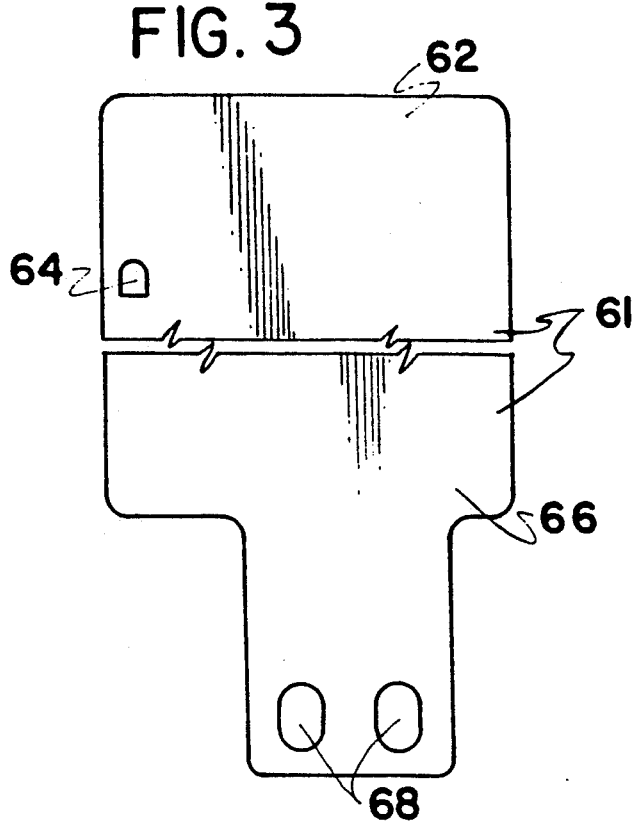
FIG. 3 is a broken plan view of a strip of film useful with film cassettes of the invention.

FIG. 3 is a broken plan view of a strip of film useful with film cassettes of the invention. As shown, the innermost end of the film 66 is provided with perforations 68 which are engaged by spoof film anchors 30, previously discussed. The film is coiled about the spool 28, leaving only the free end of the film 62 unwound. In its initial position on the cassette, the free end 62 of the film 61 extends over the exterior surface of the thrust wing 36, the film thrust detent hook 40 extending through perforation 64. The cassette operates in the following manner.

The cassette is inserted into the camera with which it is to be used, and the latter is closed and activated. Activation may be by any of the means commonly employed, for example, by the pressing of an electric drive activation button which initiates the driving engagement of wing drive spindle 54, causing it to rotate thrust wing 36 in a counterclockwise direction, as seen in FIG. 2. As the wing, and its associated end plates rotate, cams 39a and 39b urge against the lid cam followers 29, forcing the lid partially open. Also as the thrust wing 36 rotates, the film thrust detent hook 40 pushes against film perforation 64 through which it extends, forcing the free end of the film out of the mouth of the now partially opened cassette and into engagement with thrust rollers, or some equivalent mechanism which pulls the film across the film gate and into engagement with a windup mechanism. The windup mechanism advances the film until all of its frames have been exposed. At that point, the rewind mechanism is activated, causing the spool drive spindle 56 to rotate spool 28 rewinding the film into the cassette. As the last of the film prepares to enter the mouth of the cassette, the perforation 64 is optically or otherwise detected, causing wing drive spindle 54 to rotate the thrust wing 36 slightly clockwise. This results in recamming of the followers 29 by cams 39a and 39b, producing a slight closing of the lid 14.

Following camming of the lid into this intermediate position, ribs 31 are brought into engagement with the surface of the film, forcing perforation 64 again onto film thrust detent hook 40. After the film is thus rehooked, the final winding of the film into the cassette provides the force to further drive the cams 39a and 39b against the followers on the lid thereby completely closing and locking the cassette. With the film rehooked as described, it is in condition for again being thrust from the cassette during film processing. Photo optical and other sensors of the type required to detect the thrust perforation 64 are well known in the industry, and require no further description. Likewise, the dimensions of the operative components of the cassette may be varied in ways readily comprehended by those skilled in the photographic arts. Such dimensions, for example, will depend upon the nature of the film, and the type of camera to be employed with the cassettes.

While the location of the film thrust detent hook 40 on the wing panel 38 is not critical, it has been found to be of advantage to locate the hook at the rear end of the wing panel, as shown in the Figures. This allows the wing to rotate out of the way of the film in the film dispensing mode of the cassette, thereby reducing film friction and avoiding scratching of the film's emulsion.

Figure 4A:
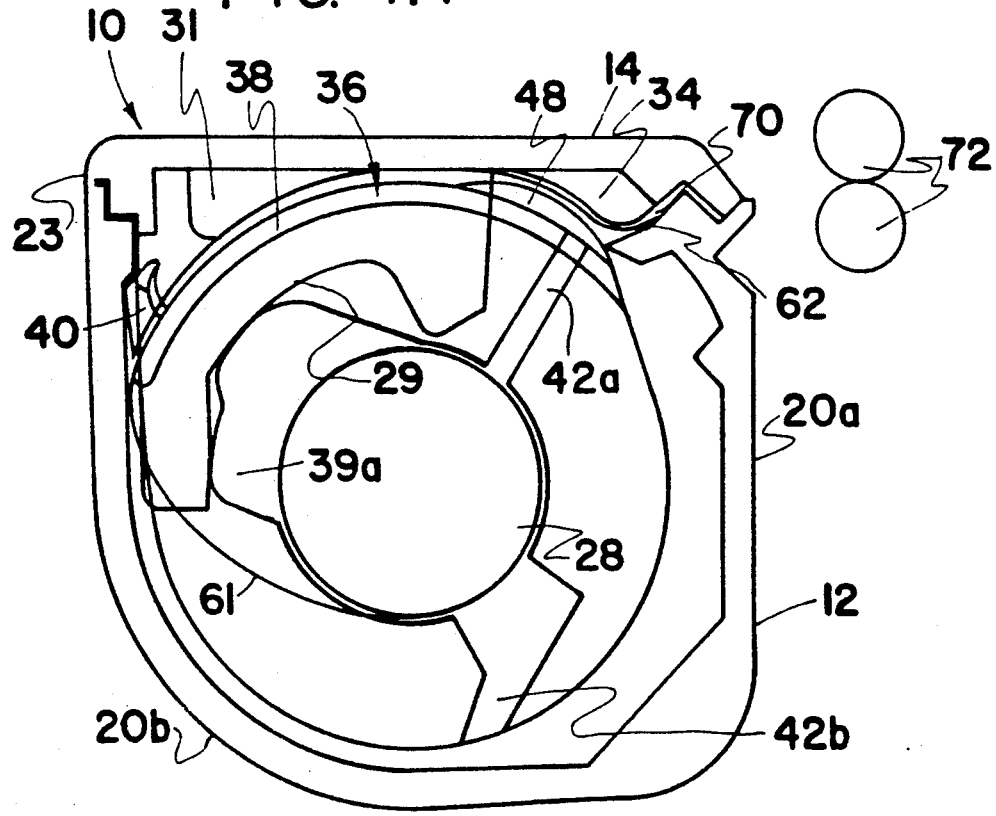
FIG. 4A is a semi-schematic, cross-sectional end view of a film cassette of the invention in its film storage configuration.

FIGS. 4A-4B show a series of semi-schematic, cross-sectional end views of the film cassette of the invention in its various modes of operation as follows.

FIG. 4A shows the film cassette in its film storage configuration. As shown, thrust wing 36 is housed in a cassette consisting of a body 12 provided with a hinged lid 14. A film strip 61 passes over the exterior convex wing panel 38 of the thrust wing 36. The free end of the film 61 rests upon the cassette body lip 70, while the film thrust detent hook 40 extends through an engagement perforation in the film. A cam 39 lies adjacent to lid cam follower 29, holding the lid 14 in its closed position. Rotation stop 42b can be seen, as can be rotation stop 42a, the latter preventing counterclockwise movement of the thrust wing 36. Rib 31, inoperative in this position, may also be seen in the Figure.

FIG. 4B shows the cassette in its film-dispensing position. As shown, the thrust wing 36 has been rotated in a clockwise position, causing cam follower 29 to be forced upwardly by cam 39, forcing the lid 14 hinged to body 12 into an upward position. As the thrust wing 36 rotates, the film thrust detent hook 40 has forced film 61 out through the cassette mouth 74 into engagement with thrust rollers 72. While rotation stop 42a serves no purpose in the cassette configurational mode illustrated, rotation stop 42b will eventually engage follower 29, preventing clockwise rotation beyond a certain point. Also in the position shown, rib 31 plays no part with respect to film 61.

FIG. 4C shows the cassette in its intermediate, film re-hooking position which is assumed after sensing means in the camera has detected the end of film 61 during the film rewinding process. At this point, the thrust wing 36 is rotated counterclockwise, causing cam 39 to allow lid 14 to assume a more closed position, bringing film 61 into proximal contact with rib 31. This facilitates booking of the perforation in film 61 on the film thrust detent hook 40, the further winding of the film bringing the cam even more forcefully into engagement with the follower 29, resulting in frilly closing and locking the lid 14. Rotational stops 42a and 42b are also shown.

Figure 5:
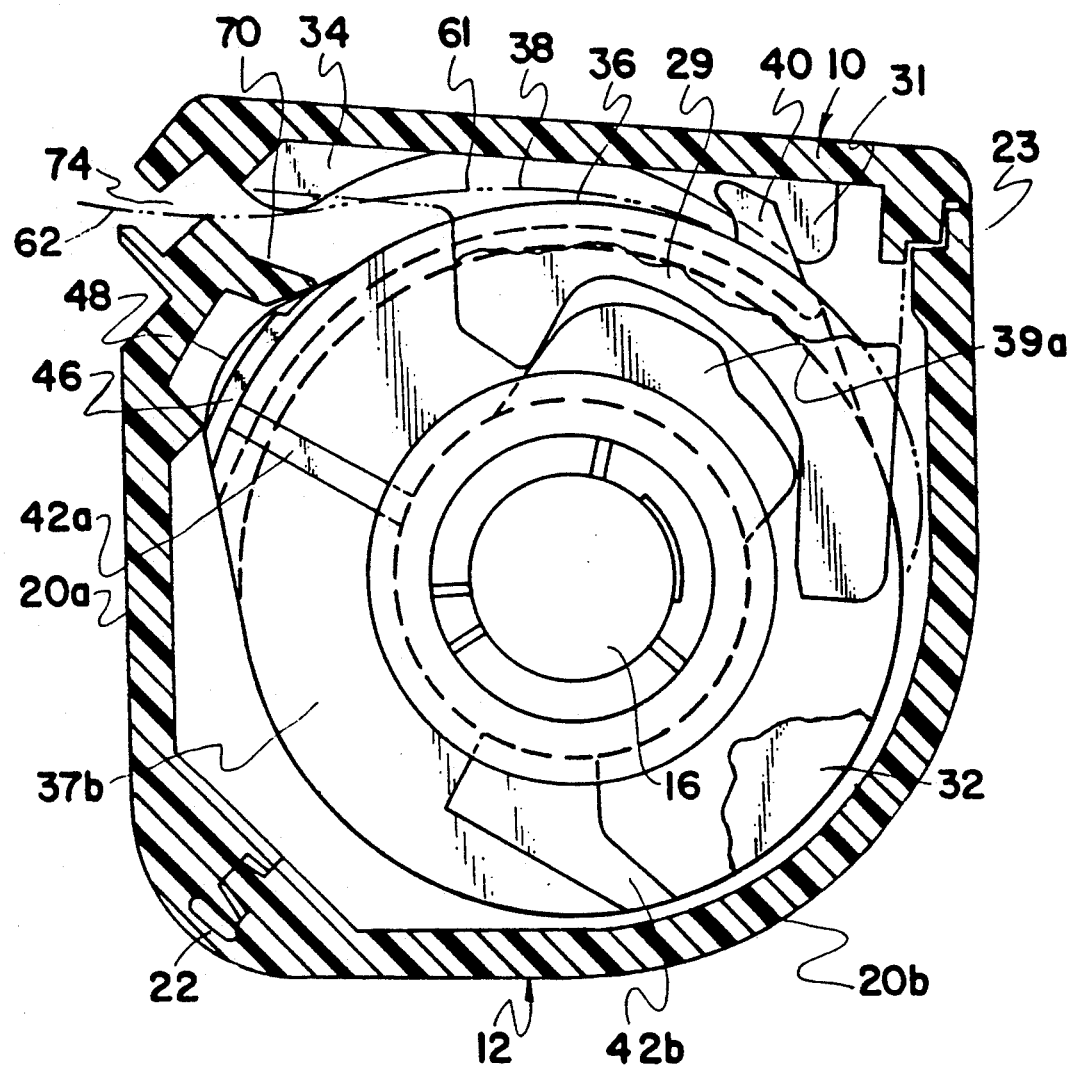
FIG. 5 is a cross-sectional end view of a film cassette of the invention along line 5—5 of FIG. 1.

FIG. 5 is a cross-sectional end view of a film cassette of the invention along line 5—5 of the FIG. 1. The Figure shows the lid 14 of the cassette in a partially opened position in which the lid has been rotated about lid hinge 23 to a limited degree as a consequence of the urging of cam 39a against a lid cam follower 29. The film-engaging ribs 31 and film guides 34 extending from the bottom of the lid 14 may also be seen. The purpose of the engaging ribs 31 in forcing film, not shown, over film thrust detent hook 40 has already been described; the purpose of the film guides 34 is to space the film away from the surface of lid 14 during travel of the film in and out of the cassette, thereby avoiding damage to the film's emulsion.

Also to be seen in the Figure is the friction detent 48 whose engagement against the interior surface of the cassette's housing maintains the wing's position in a selected setting. The friction detent 48 and the film guide shoulder 46 both extend from the wing panel 38, with which rotational stops 42a and 42b are associated. Details of the wing drive spindle engaging structure 17 and the hinged body segments 20a and 20b are also shown.

While other materials of construction may be employed in fabricating the hinged cassettes of the invention, plastics have been found to be particularly suitable since they are easily fabricated and relative inexpensive. Among such plastics may be mentioned polystyrene, polycarbonate, polyethylene, polypropylene and others.

While in accordance with the patent statutes, a preferred embodiment and best mode has been presented, the scope of the invention is not limited thereto, but rather is mentioned by the scope of the attached claims.

We claim:

1. An improved photographic film cassette including:
   (a) a housing with two ends, a hinged lid, and an access opening for receiving a drive device;
   (b) a spool having a shaft with two ends and annular constraining flanges on the spool ends for holding film thereon, and having a spool drive receiver aligned with the housing access opening, the spool being rotatable in the housing,
   wherein the improvement comprises a rotatable panel member having:
   two ends with plates thereon, each plate having an outer face with camming means on at least one of the faces, said plates receiving the spool therebetween;
   a transversely convex wall extending between the panel member ends, said wall having film-engaging means, and
   drive-receiving means for a drive device to rotate the panel member within said housing,
   wherein said lid has cam-following structure operatively engageable by said camming means of the panel member to open and close said lid, while said film-engaging means interacts with the film on said spool to move the film from the cassette when the lid is opened and film is unwound, and to close the lid when the film is rewound.

2. A cassette according to claim 1 in which said panel member has rotation-limiting means located thereon for limiting the rotation of the panel member.

3. A cassette according to claim 1 in which said camming means are located on the outer face of both said plates.

4. A cassette according to claim 3 in which said wall is provided with a raised portion that produces frictional engagement with said housing during the panel member's rotation.

5. A cassette according to claim 1 in which said film-engaging means is a detent projecting from said wall, adapted to interact with a perforation in said film.

6. A cassette according to claim 5 in which said lid has an inner surface provided with protrusions extending therefrom to facilitate said interaction of the film with said detent during film rewinding.

7. A cassette according to claim 1 in which said housing is provided with structure for engaging said rotation-limiting means, to limit the rotation of said panel member.

8. A cassette according to claim 1 in which said spool drive-receiving means and said panel member drive-receiving means are located in said housing adjacent the drive access opening in the housing.

9. A cassette according to claim 1 which contains photographic film therein.

10. An improved photographic film cassette including:
    (a) a housing with two ends, a hinged lid, and an access opening for receiving a drive device;
    (b) a spool having a shaft with two ends and annular constraining flanges on the spool ends for holding film thereon, and having a spool drive receiver aligned with the housing access opening, the spool being rotatable in the housing,
    wherein the improvement comprises a rotatable panel member having:
    two ends with plates thereon, each plate having an outer face with camming means, said plates receiving the spool therebetween;
    a transversely convex wall extending between the panel member ends, said wall having a film-engaging detent, and
    drive-receiving means for receiving a drive device to rotate the panel member within said housing,
    wherein said lid has cam-following structure operatively engageable by said camming means of the panel member to open and close said lid, while said film-engaging detent interacts with the film on said spool to move the film from the cassette when the lid is opened and film is unwound, and to close the lid when the film is rewound.

11. A cassette according to claim 10 in which said surface is provided with a raised portion that provides frictional engagement with said housing during said panel member's rotation.

12. A cassette according to claim 10 in which said housing and said panel member are provided with interacting means limiting rotation of said panel member.

13. A cassette according to claim 10 in which said lid has an inner surface provided with protrusions extending therefrom to facilitate engagement of the film with said detent.

14. A cassette according to claim 10 which contains photographic film.

* * * * *